(No Model.)
H. F. MANN.
CAR WHEEL.
No. 468,675.  Patented Feb. 9, 1892.
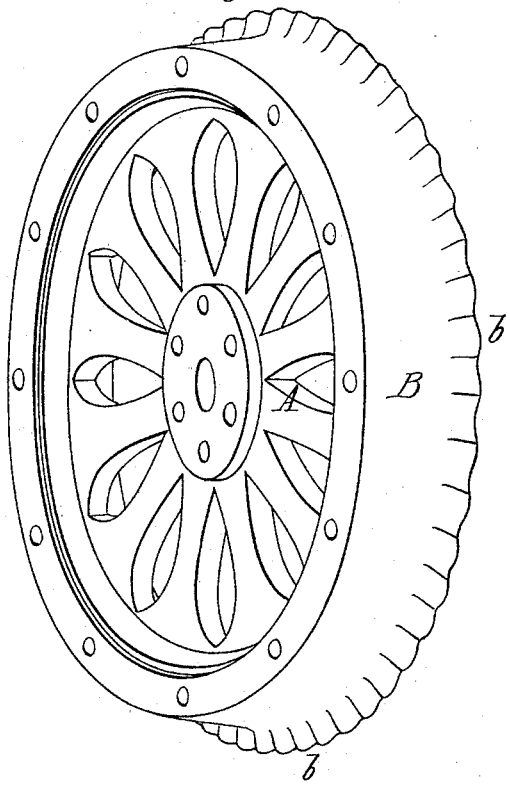
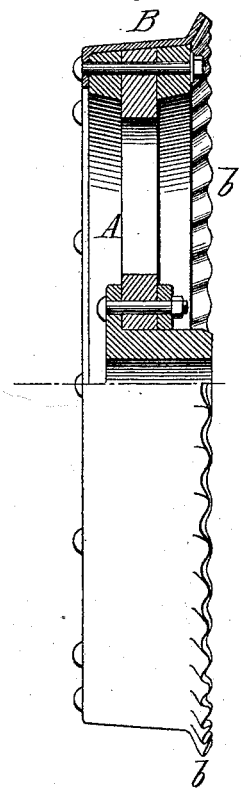
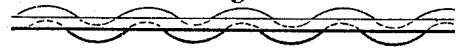
Witnesses
Raymond F. Barnes
N. R. Kennedy
Inventor
H. F. Mann
By Phil. T. Dodge
Attorney

UNITED STATES PATENT OFFICE.

HENRY F. MANN, OF ALLEGHENY, PENNSYLVANIA.

CAR-WHEEL.

SPECIFICATION forming part of Letters Patent No. 468,675, dated February 9, 1892.

Application filed October 16, 1891. Serial No. 408,940. (No model.)

*To all whom it may concern:*

Be it known that I, HENRY F. MANN, of Allegheny, county of Allegheny, and State of Pennsylvania, have invented a new and useful Improvement in Car-Wheels, of which the following is a specification.

My invention has reference to car-wheels which have their treads and flanges formed from sheet metal, and the aim of the invention is to produce a sheet-metal flange which shall have the same guiding functions as the ordinary solid flanges, especially when the wheel is passing through switches and frogs. To this end I form the flange of a corrugated, crimped, or serpentine form, so that, although the metal is thin, the flange will present when viewed edgewise the same or substantially the same outline as the common flange. The high points or elevations on the two sides will contact with the rails in such manner as to prevent that excessive side play which would attend the use of a thin straight flange.

The essential feature of the invention resides in the corrugation of the flange, and the wheel may be in all other respects of any ordinary or suitable construction.

For purposes of illustration I have in the drawings selected a wheel in which the tire or rim is applied to a "built-up" center or wheel proper.

In the accompanying drawings, Figure 1 is a perspective view of a wheel embodying my invention. Fig. 2 is an edge view, partly in section. Figs. 3, 4, 5, and 6 are views showing a few of the many shapes which the corrugations may assume.

In Figs. 1 and 2, A represents the body of the wheel or wheel proper, consisting of spokes secured to a flanged hub and united to a rim or tread, and B is a sheet-metal tire fitted tightly upon the wheel and having at one edge the peripheral outwardly-extending rail-flange *b*, formed by pressing, spinning, or otherwise turning the edge outward. This rail-flange, instead of being straight, is crimped or corrugated transversely throughout its length, so that the high points on its inner and outer sides stand in planes at some distance apart. This rail-flange, instead of extending around the wheel in a straight line, is corrugated or bent laterally throughout its length, so that the high points or elevations on the inner and outer sides stand in planes separated a distance equal to the thickness of the usual solid flange. When, therefore, the wheel is in use, the high points of the flanges will contact with the rails on the inner or outer sides, or both, as the case may be, and guide the wheel not only along the ordinary rail, but through switches, frogs, and crossings with the same effect as a flange presenting a smooth continuous surface. The shape or figure of the corrugation may be varied at will, provided only the elevations occur at such short intervals as to avoid any tendency on the part of the wheel to climb the rail.

Figs. 3, 4, 5, and 6 show forms well adapted for practical use. Where lightness is desirable, the corrugated form of the flange may be used on cast-metal wheels.

Having thus described my invention, what I claim is—

1. A car-wheel having a tread adapted to travel on the rail and a corrugated metal flange, substantially as and for the purpose described.

2. A car-wheel having a tread adapted to travel on the rail and a corrugated sheet-metal flange, substantially as described.

3. A car-wheel having a sheet-metal tread with one edge turned outward and corrugated to form a flange.

In testimony whereof I hereunto set my hand, this 10th day of October, 1891, in the presence of two attesting witnesses.

HENRY F. MANN.

Witnesses:
W. R. KENNEDY,
PHIL. T. DODGE.